US010405132B2

(12) United States Patent
Agarwal et al.

(10) Patent No.: US 10,405,132 B2
(45) Date of Patent: *Sep. 3, 2019

(54) PRECISE AND CUSTOM LOCATION BASED SERVICE DISCOVERY APPLICATION FOR WIRED AND WIRELESS DEVICES

(71) Applicant: Aruba Networks, Inc., Sunnyvale, CA (US)

(72) Inventors: Gopal Agarwal, South Talluk Bangalore (IN); Ramalingeswara Reddy, South Talluk Bangalore (IN); Sachin Shamrao Sanap, South Talluk Bangalore (IN); Ashish Vyas, South Talluk Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,778

(22) Filed: Sep. 29, 2017

(65) Prior Publication Data
US 2018/0027372 A1  Jan. 25, 2018

Related U.S. Application Data

(63) Continuation of application No. 14/266,492, filed on Apr. 30, 2014, now Pat. No. 9,788,154.

(51) Int. Cl.
| H04L 29/08 | (2006.01) |
| H04W 4/021 | (2018.01) |
| H04W 64/00 | (2009.01) |
| H04W 84/12 | (2009.01) |

(52) U.S. Cl.
CPC ............ *H04W 4/021* (2013.01); *H04L 67/16* (2013.01); *H04L 67/18* (2013.01); *H04W 64/00* (2013.01); *H04W 84/12* (2013.01)

(58) Field of Classification Search
CPC ......... H04W 64/00; H04L 67/16; H04L 67/18
See application file for complete search history.

(56) References Cited

U.S. PATENT DOCUMENTS

| 9,788,154 | B2 * | 10/2017 | Agarwal | H04W 4/021 |
| 2010/0208648 | A1 * | 8/2010 | Narkar | H04W 4/18 370/328 |
| 2011/0022676 | A1 * | 1/2011 | Thomson | H04W 8/12 709/208 |

* cited by examiner

*Primary Examiner* — Kim T Nguyen
(74) *Attorney, Agent, or Firm* — Hewlett Packard Enterprise Patent Department

(57) ABSTRACT

Example method includes determining, by a network management device, a location of a client device in a wireless local area network (WLAN); identifying, by the network management device, a first region comprising the location of the client device, wherein an irregular boundary of the first region is arbitrarily defined on a floor plan based on a device sharing policy; determining, by the network management device, that the device sharing policy permits the client device to discover a network service provided by at least one network device; and selecting, by the network management device, the at least one network device to be presented as providing the network service available to the client device.

20 Claims, 6 Drawing Sheets

PRECISE AND CUSTOM LOCATION BASED SERVICE DISCOVERY APPLICATION FOR WIRED AND WIRELESS DEVICES

FIELD

The present disclosure relates to resource sharing and service management in a wireless local area network (WLAN). In particular, the present disclosure relates to an improved mechanism for providing precise and custom location-based service discovery application for wired and/or wireless devices.

BACKGROUND

Wireless digital networks, such as networks operating under the current Electrical and Electronics Engineers (IEEE) 802.11 standards, are spreading in their popularity and availability. In a WLAN deployment, there could be multicast-based service discovery protocols, such as, multicast Domain Name System (mDNS) and/or Simple Service Discovery Protocol (SSDP), proxy implementation that builds service database of mDNS and/or SSDP capable devices. Each of servicing network devices will present on Virtual Local Area Networks (VLANs) that are visible to it by making periodical announcement of its services using multicast network packets in the WLAN.

Information regarding the servicing network devices will be cached by a network controller device in a service database. Based on the content of the service database, the network system may apply various policies to customize and/or restrict services. Specifically, the servicing network device can terminate incoming queries, and respond to them by looking into its own database and applying policies, such as time-based policies, role-based policies, location-based policies, and so on. This mechanism allows visibility of servicing network devices to client devices based on information associated with the client devices, for example, a user name, a role, a time, a location, etc.

Current location-based service discovery mechanism restricts the service filtering to radio frequency (RF) neighborhood of an access point (AP), to an entire floor, or to an AP group. If a client device is associated with an AP that is within the RF neighborhood of the server's shared AP, the location is considered to be matching and access will be granted. The WLAN cannot control this kind of proximity-based location sharing in a specific or customized region.

Based on the wireless signal strength, WiFi bandwidth, interference level, and multiple other factors, the RF neighborhood changes. Therefore, the actual range of service availability changes accordingly. Moreover, floor based or AP group based sharing is not flexible. In addition, the growing density of wireless devices in WLANs could lead to more than required, e.g. irrelevant servers, being discovered by unintended client devices. Hence, a practical and visual way of defining boundaries of physical regions for limiting the sharing of services rendered by servicing network devices would be desirable.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to network resource sharing and service management in WLANs, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to resource sharing and service management in a wireless local area network (WLAN). In particular, the present disclosure relates to an improved mechanism for providing precise and custom location-based service discovery application for wired and/or wireless devices.

With the solution provided herein, a disclosed network device determines a location of a client device. The disclosed network device also identifies a first region including the location of the client device, and identifies at least one network device associated with the first region. Responsive at least to determining that the at least one network device is associated with the first region that comprises the location of the client device, the disclosed network device selects the at least one network device, from a set of network devices, for presenting as an available resource to the client device.

Computing Environment

Figure 1:
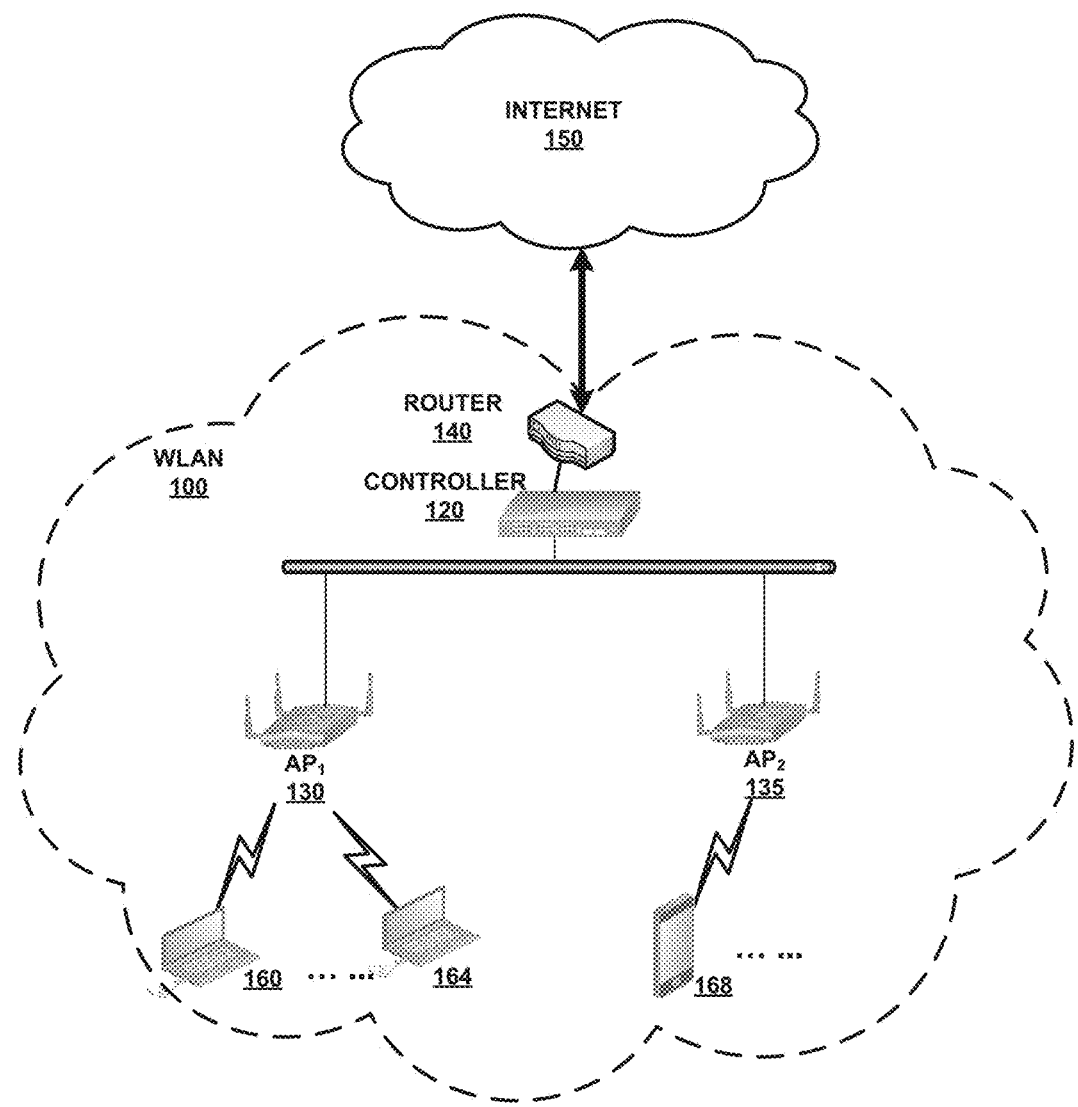
FIG. 1 shows exemplary computing environment according to embodiments of the present disclosure.

FIG. 1 shows exemplary computing environment according to embodiments of the present disclosure. Specifically, FIG. 1 includes a controller 120 that is communicatively coupled with one or more access points (APs), such as $AP_1$ 130 and $AP_2$ 135, to provide wireless network services by transmitting network packets to a number of wireless client devices, such as client devices 160-164 and 168, etc. Moreover, WLAN 100 may be also connected to Internet 150 or another external network via a router 140.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Moreover, in the exemplary network depicted in FIG. 1, a number of client devices are connected to the access points in the WLAN. For example, client devices 160-164 are associated with $AP_1$ 130, and client devices, such as client device 168, are associated with $AP_2$ 135. Note that, client devices may be connected to the access points via wired or wireless connections.

During operations, a wireless station, such as client device 160, client device 164, or client device 168, is associated with a respective access point, e.g., access point $AP_1$ 130, access point $AP_2$ 135, etc. Upon successful association with a respective AP, a client device can discover a number of servicing network devices within the radio frequency (RF) neighborhood of the client device in WLAN 100. The servicing network devices may include, but are not limited to, a printer, a scanner, a projector, a copier, a TV monitor, etc.

The specific servicing network device that a particular client device can discover depends on a set of policies configured by a system administrator. For example, in a university campus WLAN employment, there is a wireless AppleTV® in a classroom. A system administrator may configure the WLAN to allow only teachers teaching in the classroom to access the AppleTV®. Thus, whenever a client device associated with a user assigned with the role of a teacher is physically located within the classroom, the client device will be able to detect the WiFi presence of AppleTV® in the classroom. By contrast, if a student bringing a mobile wireless device into the classroom, the student's mobile wireless device will not be able to discover the WiFi presence of AppleTV® in the classroom. Likewise, a client device associated with another teacher who is located outside the classroom in the building will not be able to discover the WiFi presence of AppleTV® device in the classroom, even though the other teacher may be located within the RF neighborhood of the AppleTV® device.

Servicing Network Device Policy Management

Figure 2A:
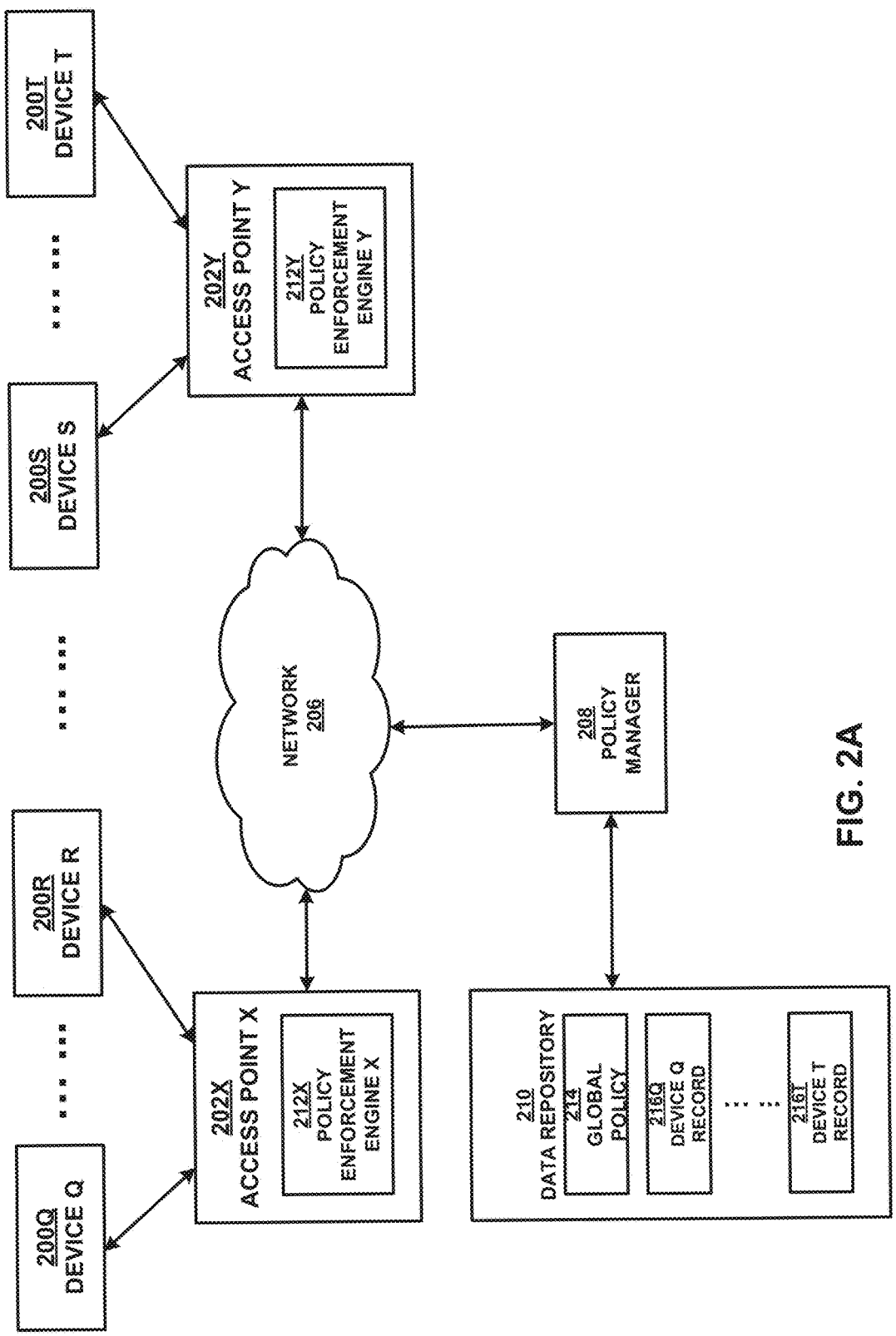
FIGS. 2A-2B illustrate exemplary servicing network device policy management mechanism according to embodiments of the present disclosure.

FIG. 2A shows a servicing network device policy management scheme in accordance with one or more embodiments. As shown in FIG. 2, the system includes devices (e.g., device Q (200Q), device R (200R), device S (200S), device T (200T)), access points (e.g., access point X (202X), access point Y (202Y)), a network (206), a policy manager (208), and a data repository (210). Each of these components is discussed below in accordance with one or more embodiments.

In one or more embodiments, a device (e.g., device Q (200Q), device R (200R), device S (200S), device T (200T)) is a hardware component that receives a service from another device of the system and/or provides a service to another device of the system. Specifically, when the device receives a service, the device may be referred to as a client device with respect to the service. When a device provides a service, the device may be referred to as a shared device with respect to the service. A shared device is a device that provides services to at least one client device. If the shared device provides services to multiple client devices, the services may or may not be provided at the same time. In one or more embodiments, each particular device (e.g., device Q (200Q), device R (200R), device S (200S), device T (200T)) in FIG. 2A may be a client device and a non-shared device, a shared device and a non-client device, or both a client device and a shared device.

In one or more embodiments, a device (e.g., device Q (200Q), device R (200R), device S (200S), device T (200T)) may be one or more mobile devices (e.g., laptop computer, smart phone, personal digital assistant, tablet computer, or other mobile device), gaming console, desktop computers, servers, blades in a server chassis, or any other type of electronic device or devices that includes at least the minimum processing power, memory, and input and output device(s) to perform one or more embodiments. For example, the device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. The device may also include one or more input device(s), such as a touchscreen, keyboard, mouse, microphone, touchpad, electronic pen, or any other type of input device. Further, the device may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely (e.g., via the network) connected to the hardware processor(s), memory, and storage device(s). Many different types of devices exist, and the aforementioned input and output device(s) may take other forms.

The device may be connected to a network (206) via a network interface connection (not shown) and an access point (e.g., access point X (202X), access point Y (202Y)). The network (206) may be a local area network (LAN), a wide area network (WAN) such as the Internet, mobile network, or any other type of network, or a combination of networks.

An access point (e.g., access point X (202X), access point Y (202Y)) is a digital hardware device that may be communicatively coupled to the network (206). The access point (e.g., access point X (202X), access point Y (202Y)) is a separate hardware unit from device (e.g., device Q (200Q), device R (200R), device S (200S), device T (200T)), that is directly, wired or wirelessly, connected to the device and is in a communication path from the device to the network. In other words, the access point may be directly connected via the direct wired/wireless connection (204) to a network interface card on the device (e.g., device Q (200Q), device R (200R), device S (200S), device T (200T)). Further, access points may be directly connected to the network (206) or connected via a controller. By way of an example, the access point may include a wireless access point (WAP) that communicates wirelessly with devices using Wi-Fi, Bluetooth or related standards and that communicates with a wired network.

Each access point may be connected to any number of devices at any moment in time. Specifically, each access point may be connected to no devices, a single device, or multiple devices at any particular moment in time. Further, the number of devices connected to an access point may be heterogeneous amongst access points.

One or more of the access points may include a policy enforcement engine (e.g., policy enforcement engine X (212X), policy enforcement engine Y (212Y)). In one or more embodiments, a policy enforcement engine (e.g., policy enforcement engine X (212X), policy enforcement engine Y (212Y)) is hardware, software, firmware, or a combination thereof that includes functionality to enforce policies (e.g., time defined sharing policy (224) (discussed below), global policies (214) (discussed below)). In one or more embodiments, the policy enforcement engine may include functionality to obtain a shared policy and/or a global policy, make a decision whether a client device may use a particular shared device based on the shared policy and/or global policy, and deny access and/or not expose the shared device to the client device based on the decision. Alternatively or additionally, the policy enforcement engine may include functionality to obtain, from a cache (not shown) on the access point, a cached decision indicating whether the client may use a particular shared device and deny access and/or not expose the shared device to the client device based on the decision.

Continuing with FIG. 2A, the access points (e.g., access point X (202X), access point Y (202Y)) may be operatively connected, continuously or intermittently, directly or via the network, to a policy manager (208). The policy manager (208) may correspond to a computing system or execute on a computing system and cause the computing system to manage policies (e.g., global policies (214), time defined sharing policy (224)). Managing policies may include receiving new policies, deleting old policies, ensuring that policies on the access points are current, transmitting policies and/or decisions to the access points (e.g., access point X (202X), access point Y (202Y)), associating users with policies, and performing other actions.

The computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, the computing system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. The computing system may also include one or more input device(s), such as a touchscreen, keyboard, mouse, microphone, touchpad, electronic pen, or any other type of input device. Further, the computing system may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system may be connected to a network (106) (e.g., a local area network (LAN), a wide area network (WAN) such as the Internet, mobile network, or any other type of network) via a network interface connection (not shown). The input and output device(s) may be locally or remotely (e.g., via the network) connected to the computer processor(s), memory, and storage device(s). Many different types of computing systems exist, and the aforementioned input and output device(s) may take other forms. Further, one or more elements of the aforementioned computing system may be located at a remote location and connected to the other elements over a network.

Continuing with FIG. 2A, the policy manager (208) is connected to a data repository (210). In one or more embodiments, the data repository (210) is any type of storage unit and/or device (e.g., a file system, database, collection of tables, or any other storage mechanism) for storing data. Further, the data repository (210) may include multiple different storage units and/or devices. The multiple different storage units and/or devices may or may not be of the same type or located at the same physical site. Further, the data repository may be or may execute on the same computing system as policy manager (208). Alternatively or additionally, the data repository (210) may be on a separate computing system.

The data repository (210) includes functionality to store global policies (214) and device records (e.g., device Q record (216Q), device T record (216T)) for each device connected to an access point (e.g., access point X (202X), access point Y (202Y)) in the system. A global policy (214) is a policy that applies to all devices. For example, a global policy (214) may be to enforce an ordering of the shared devices when presented to a user, that the shared devices are to be filtered based on location of the access point directly connected to the client device, and other such policies.

A device record (e.g., device Q record (216Q), device T record (216T)) is information about a device. Any mechanism may be used to store a device record without departing from the scope of the claims. In particular, a device record may be a file, a database record, an entry or row in a table, or another data structure.

Figure 2B:
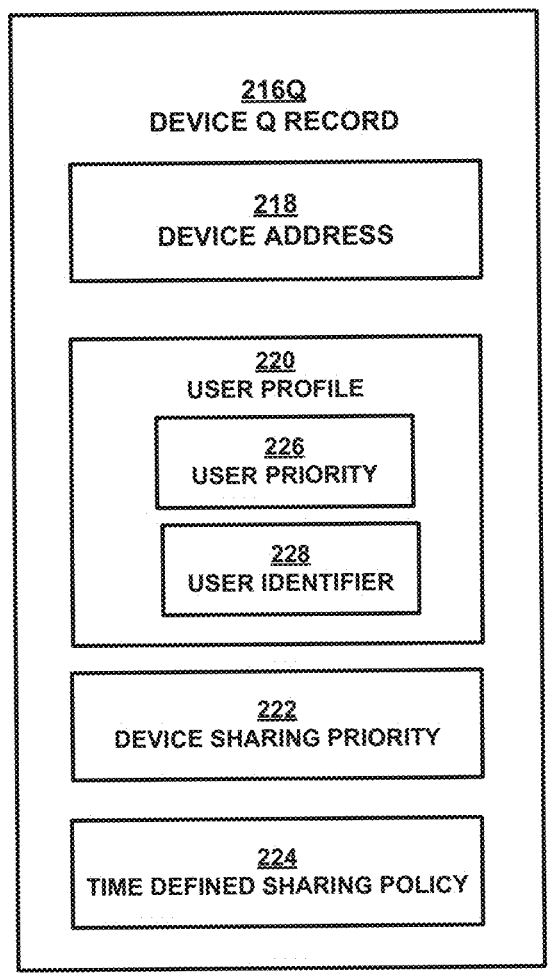

FIG. 2B shows an expanded view of device Q record (216Q) in one or more embodiments. The same or similar record may exist for the various other devices in the system. As used herein a device record includes data when the data is directly in the storage structure of the device record or when the device record directly or indirectly links to the data.

As shown in FIG. 2B, device Q record (216Q) may include a device address (218), a user profile (220), a device sharing priority (222), and a time defined sharing policy (224) in accordance with one or more embodiments. Each of these components is discussed below.

A device address (218) is a unique identifier for a device. For example, the device address may be a media access control (MAC) address, a serial number of the device, or another unique identifier of the device.

In one or more embodiments, the user profile (220) corresponds to information about a user of the device. A user profile (220) may include a user identifier (228) and a user priority (226). A user identifier (228) is a unique identifier of a user. The user identifier (228) may be a single piece of identification (e.g., tax identifier, login name, email address, a system assigned unique identifier) or combination of identifiers (e.g., combination of mailing address and name, combination of name and birthdate, or other combination). A user priority is a value that defines the rank of the client device user. For example, when device Q record (216Q) is for device acting in the role of a client device, the user priority defines the rank of the client device user with respect to other client device users when requesting access to one or more shared devices. Thus, the user priority defines an importance of a client device user using services of a shared device as compared to other client device users using services from a shared device. In one or more embodiments, the user priority may be an independently defined value on a scale. For example, each user may be assigned a value from one to ten irrespective of the value assigned to other users. In one or more embodiments, the user priority may be a relative ranked value of the user with respect to other users. In other words, the users may be ordered and a value assigned to the user that defines the position of the user with respect to the order.

Continuing with FIG. 2B, in one or more embodiments, a device sharing priority (222) is a priority assigned to a device. In one or more embodiments, the device sharing priority (222) defines a rank of the shared device with respect to other devices. The device sharing priority is defined based on whether a service of the particular shared device is to be preferred over other devices. For example, shared devices in a conference room may be assigned a higher device sharing priority value than shared devices in individual offices. Further, shared devices of individual users may be assigned a lower device sharing priority value than shared devices belonging to the IT department. In one or more embodiments, the device sharing priority is globally defined. In other words, the device sharing priority is defined independently of the access to the device. Thus, the device sharing priority for a shared device does not depend on the user, location of the client device, or client device accessing the shared device. Similar to the user priority (226), the device sharing priority (222) may be independently defined on a scale with respect to other shared devices or may be defined relative to other shared devices.

In one or more embodiments, the time defined sharing policy (224) is a sharing policy that is dependent on time. A sharing policy may specify a collection of users that may use the shared device, a collection of client devices that may use the shared device, respective access rights that each user or client device may have with respect to using the client device, and other permissions required to use the shared device. In one or more embodiments, the time defined sharing policy (224) may specify a start time and an expiration time for the time defined sharing policy. The start time is the time in which the time defined sharing policy begins to be effective. The expiration time is the ending time in which the time defined sharing policy stops being effective. Various mechanisms may be used to specify the start time and/or expiration time. For example, the start time and/or expiration time may be defined relative to an event (e.g., start of business day, a user logging in, conference times, or another event), defined in absolute values, defined relative to the expiration time or the start time, or defined using another technique. Further, the times may be defined as recurring or at a single moment. The same device may have multiple time-defined sharing policies. For example, one time defined sharing policy may be for the shared device user and another time defined sharing policy may exist for client device users that may use the shared device. Other sharing policies that are not time defined may exist and be enforced without departing from the scope of the claims.

In one or more embodiments, one or more of the components of the device record may be omitted when the device is non-shared or non-client device. For example, if the device is non-client device, then the device may omit a user priority. By way of another example, if the device is non-shared device, the device may omit the device sharing priority and the time defined sharing policy in accordance with one or more embodiments.

Although not shown in FIGS. 2A-2B, software instructions in the form of computer readable program code to perform embodiments may be stored, in whole or in part, temporarily or permanently, on a non-transitory computer readable medium, such as a CD, DVD, storage device, a diskette, a tape, flash memory, physical memory, or any other computer readable storage medium. Specifically, the software instructions may correspond to computer readable program code that when executed by a processor(s), is configured to perform embodiments. The aforementioned software instructions may be or may implement all or a part of the access point (e.g., access point X (202X), access point Y (202Y)), the policy manager (208), the data repository (e.g., device Q (200Q), device R (200R), device S (200S), device T (200T)), and/or another component.

While FIGS. 2A-2B shows a configuration of components, other configurations may be used without departing from the scope of the claims. For example, various components may be combined to create a single component. As another example, the functionality performed by a single component may be performed by two or more components.

Precise and Custom Location Based Service Discovery Application

The precise and custom location based service discovery application according to embodiments of the present disclosure includes at least three components: a mapping tool, a location engine, and a policy engine.

A. Mapping Tool

First, a system administrator is able to import a map or maps of a facility (e.g., an office building, a hospital, a shopping center, etc.) to scale. Furthermore, on the map, the system administrator may be able to define precise boundary of one or more custom regions. The regions may be overlapping or non-overlapping. The regions can be a single classroom, an area including multiple adjacent rooms, and/or any dynamic boundary of regular or irregular regions that may or may not correspond to a physical boundary. Moreover, a single region can be defined across multiple floors in a floor plan. Note that, the regions do not need to be defined as corresponding to the servicing network devices. Generally, the regions can be arbitrarily defined such that the system administrator can apply various policies on resource sharing and service management within each region. The following code section provides an exemplary region definition:

```
geofence {
   int floor_id;
   int geofence_id;
   char *geofence_name;
   char *type;
   link_list*points_list; /* list of all the points that construct the geofence region*/
}
```

Each policy defined by the system administrator may be applied in a different type and/or different set of regions. The system will only allow client devices to discover services located within the same geographically defined custom region(s) and permitted for the particular user of the client device according to policies defined for those custom region (s). If a client device is located within multiple overlapping regions, then any servicing network devices in any of the multiple overlapping regions would be discoverable by the client device as long as the policies applicable to those multiple regions permits the service discovery.

Note that, the mapping tool greatly increases the precision of the geographical location control of the consumers of the services offered by a servicing network device, such as a printer, a scanner, a projector, a TV, etc. Conventionally, when a servicing network device is located within the RF neighborhood of an AP, the system administrator needs to configure that information such that client devices within the same AP's RF neighborhood would be able to discover the services offered by the servicing network device. At best, the system administrator can allow discovery by client devices located within the one-hop neighborhood. Thus, if a client device is associated with a neighboring AP, the client device will also be able to discover the services offered by the servicing network device. However, such approach does not allow the system administrator to have precise control of the boundary of the region within which services offered by a servicing network device should be discoverable by a client device.

In some embodiments, a system administrator may utilize a naming convention of the regions to tie the region to one or more policy applications. Other ways of defining regions and naming regions can be utilized as well. The method of plotting region of different dimensions could be manual, and/or could be automated by scanning through the floor plan for pre-defined patterns or strings.

B. Location Engine

Location engine allow for finding each of the client devices' location with reasonable accuracy. The mechanism utilized to find client device locations and combination of technologies involved could be chosen based on orthogonal aspects.

Also, the location engine imports region and map information from the map tool described above. The location engine further keeps track of matching region(s) as the client device moves and notifies the policy engine described below.

Note that, regardless of mechanism chosen, the location engine provides accurate and time sensitive location of the client devices in the WLAN. For example, as soon as a client device moves into or outside of the boundary of a predefined region, the location engine may generate a trigger such that policy engine and other components of the system can properly respond the location change event of the client device. The following code section provides an exemplary trigger that the location engine sends to the policy engine:

```
Geofence_trigger {
  Bool geofence_event; // IN or OUT
  Int geofence_id;
  Char *geofence_name;
  MAC sta_mac; /* MAC address of station entering
  or leaving the region*/
}
```

Also, besides client devices, the location engine can dynamically locate servicing network devices as well. Thus, when a servicing network device is first installed and brought online into the WLAN, the location engine would be able to generate a trigger to alert the policy engine that a new servicing network device has moved into a particular region.

C. Policy Engine

Policy engine in accordance with embodiments of the present disclosure generally is responsible for handling device queries. The queries are responded from a service database that is built by the policy engine. Only services allowed to be discovered by policy engine are included in the query response. The policies could be defined by the system administrator based on a combination of one or more of a region, a user role, a group, a time period, etc.

The policy engine is aware of each device's matching regions at a particular point of time. This information can be obtained from location engine. In addition, the policy engine can build a database over time for tracking servicing network devices located within each region. For example, every time when a new servicing device is discovered within a particular region, the new servicing device is added to the database as being associated with the region identifier. The following code section provides an exemplary database maintained by the policy engine for a region corresponding to a trigger received from the location engine:

```
Geofence_database_node {
  MAC sta_mac;
  Link_list *geofence_names; // list of all
  the geofence that this MAC lies in.
}
```

Upon receiving a user's query, the policy engine consults the database information and responds to the user's query with relevant (e.g., allowed by policies) servicing network devices within same region to it.

For wired-only devices, location needs to be obtained differently. Specifically, for such devices, location can be defined by the system administrator on the mapping tool. The location engine can then import the locations from the mapping tool and add to its database the learned knowledge on which region each device is located.

In some embodiments, the system can find out if the wired device is connected to a wired port on the access point. Based on the port connection, the system can infer that the wired device is geographically located close to the access point. Therefore, it is important that wired devices' locations and any matching regions shall be learnt by the policy engine. For stationary wired devices, it is generally understood that regions typically do not change unless the region itself is edited on the mapping tool.

Note that, for the purpose of the service discovery application disclosed herein, the policy engine does not need to have the actual knowledge of the precise boundary of each region. Rather, the policy engine only needs to know which devices are located within each region at any given point of time. The policy engine acquires such information as maintained in its database through, e.g., processing.

When a client device enters the boundary of a region and attempts to discover WLAN services available at the particular location, the client device will transmit a query to the policy engine. The policy engine first determines the region identifier of the region that the client device enters into. For example, upon location engine detecting that the client device has entered region$_X$, the policy engine will execute a query in the database, and present all servicing network devices within region$_X$ that are returned from the query, if the service is not restricted otherwise, e.g., by user role, time, or other factors, etc.

The aforementioned three components—the mapping tool, the location engine, and the policy engine—could be modules on the same physical box or these could each be running in a separate device. The solution described here can use any communication protocol between these three components.

Figure 3:
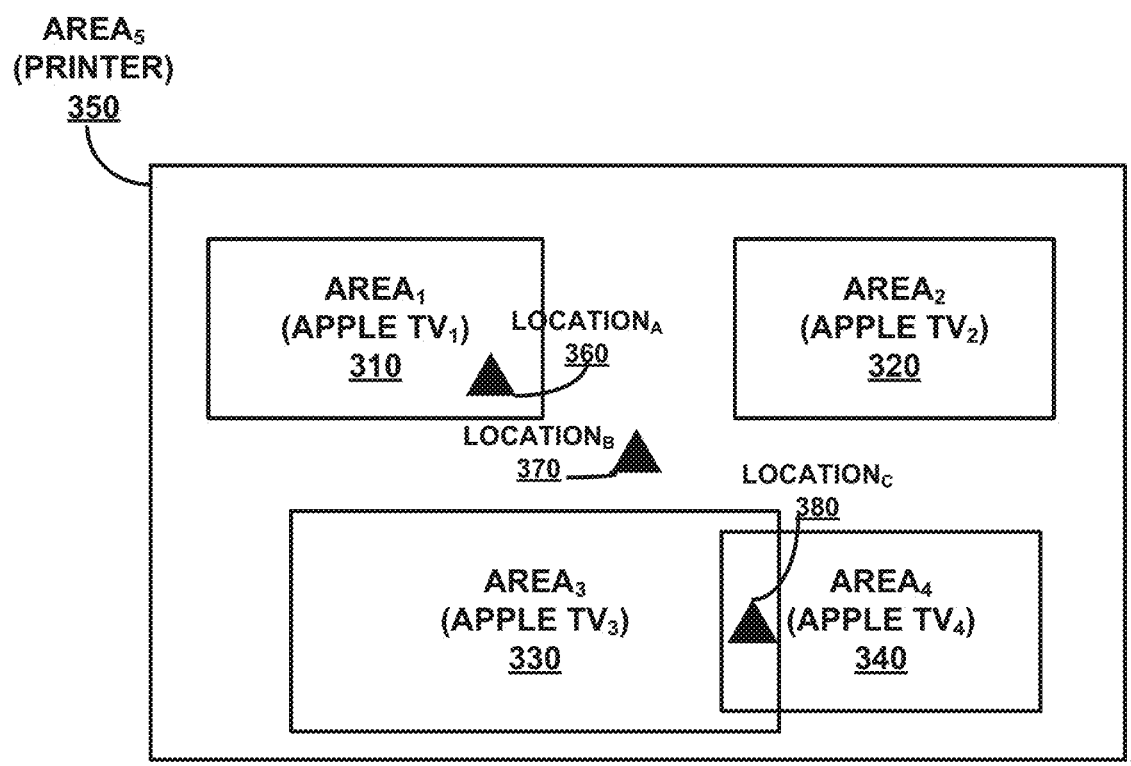
FIG. 3 illustrate exemplary an enhanced location based service discovery application according to embodiments of the present disclosure.

FIG. 3 illustrate exemplary an exemplary location based service discovery application according to embodiments of the present disclosure. In the example illustrated in FIG. 3, there are five regions defined by the system administrator, namely, area$_1$ 310 within which AppleTV$_1$ is located, area$_2$ 320 within which AppleTV$_2$ is located, area$_3$ 330 within which AppleTV$_3$ is located, area$_4$ 340 within which AppleTV$_4$ is located, area$_5$ 350 within which AppleTV$_5$ is located, etc.

Any client device located within a region on which a policy regarding service by a particular servicing network device exists can discover the service if the discovery does not violate the policy. For example, location$_B$ 370 is located inside area$_5$ 350. Assuming that a first policy configured by a system administrator states that all authenticated client devices located within area$_5$ 350 can discover and consume services from a printer. Thus, the client device located at location$_B$ 370 will be able to discover WiFi presence of the printer in the WLAN.

Note that, there are no limitations on how each region is defined. For example, one region may be a sub-area of another region (e.g., area$_1$ 310 is a sub-area of area$_5$ 350). Assuming that a second policy states that all authenticated client devices located within area$_1$ 310 can discover and consume services from AppleTV$_1$. Therefore, a client device at locations 360, which is inside the sub-area enclosed by area$_1$ 310, will be able to discover services offered by both AppleTV$_1$ and the printer.

Also, two regions (area$_3$ 330 and area$_4$ 340) may overlap with each other. In such scenarios, a client device located within the overlapped region will be able to discover services offered by both servicing network devices. For example, location$_C$ 380 is located in both area$_3$ 330 and area$_4$ 340. Assuming that a second policy states that all authenticated client devices located within area$_3$ 330 can discover and consume services from AppleTV$_3$, and that all authenticated client devices located within area$_4$ 340 can discover and consume services from AppleTV$_4$. Therefore, an authenticated client device located at location$_C$ 380 will be able to discover services from the printer, AppleTV$_3$, and AppleTV$_4$.

Furthermore, any type of conventional policies (e.g., user role based, time based, RF location based, etc.) can be configured in the same policy engine and applied in conjunction with the custom region-based policies. When multiple policies are applied together, any violation of any applicable policy will result in the servicing network device not discoverable by the client device.

Process for Precise and Custom Location-Based Service Discovery Application

Figure 4:
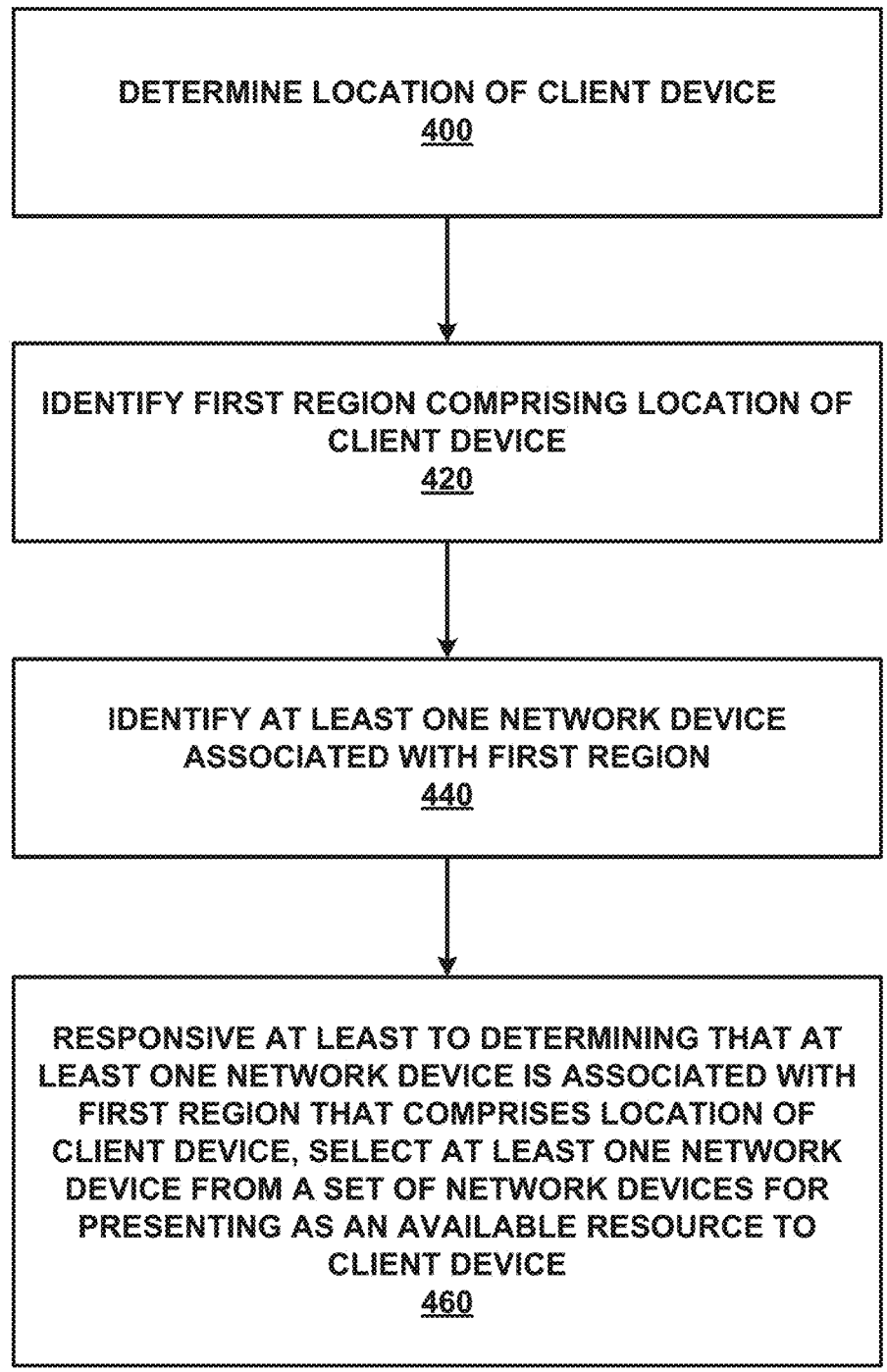
FIG. 4 illustrate an exemplary process for precise and custom location-based service discovery application for wired and wireless devices according to embodiments of the present disclosure.

FIG. 4 illustrates an exemplary process for precise and custom location-based service discovery application for wired and wireless devices according to embodiments of the present disclosure. During operations, a network device determines a location of a client device (operation 400). The network device also identifies a first region including the location of the client device (operation 420), and identifies at least one network device associated with the first region (operation 440). Responsive at least to determining that the at least one network device is associated with the first region that comprises the location of the client device, the network device selects the at least one network device, from a set of network devices, for presenting as an available resource to the client device (operation 460). Note, the at least one network device may include at least two network devices.

The first region can be defined as a physical region in a physical environment. The first region also can be defined as a particular room in a plurality of rooms.

In some embodiments, a network device can identify a second region including the location of the device, whereas the first region and the second region have an overlapping region that includes the location of the device. Then, the network device can identify a second network device, from the set of network devices, associated with the second region; and present the second network device as an available resource to the client device.

In some embodiments, the network device further determines that the client device has moved outside of the first region. Responsive to determining that the client device has moved outside of the first region, the network device removes the at least one network device from a set of resources accessible to the client device.

In some embodiments, prior to identifying the at least one network device associated with the first region: the network device detects that the at least one network device is located in the first region; and stores information indicating an association between the at least one network device and the first region.

In some embodiments, prior to identifying the at least one network device associated with the first region: the network device (a) determines that the at least one network device is connected to a second network device; (b) determines that the second network device is located in the first region; (c) based on (a) and (b) determining that the at least one network device is located in the first region; and (d) storing information indicating an association between the at least one network device and the first region.

In some embodiments, the network device selects the at least one network device, from a set of network devices based on characteristics associated with the client device and/or the set of network devices.

In some embodiments, the network device may identify the at least one network device is associated with a second region that includes the first region. In some embodiments, the regions defined for at least two network devices, of the set of network devices, are different.

System for Precise and Custom Location-Based Service Discovery Application

Figure 5:
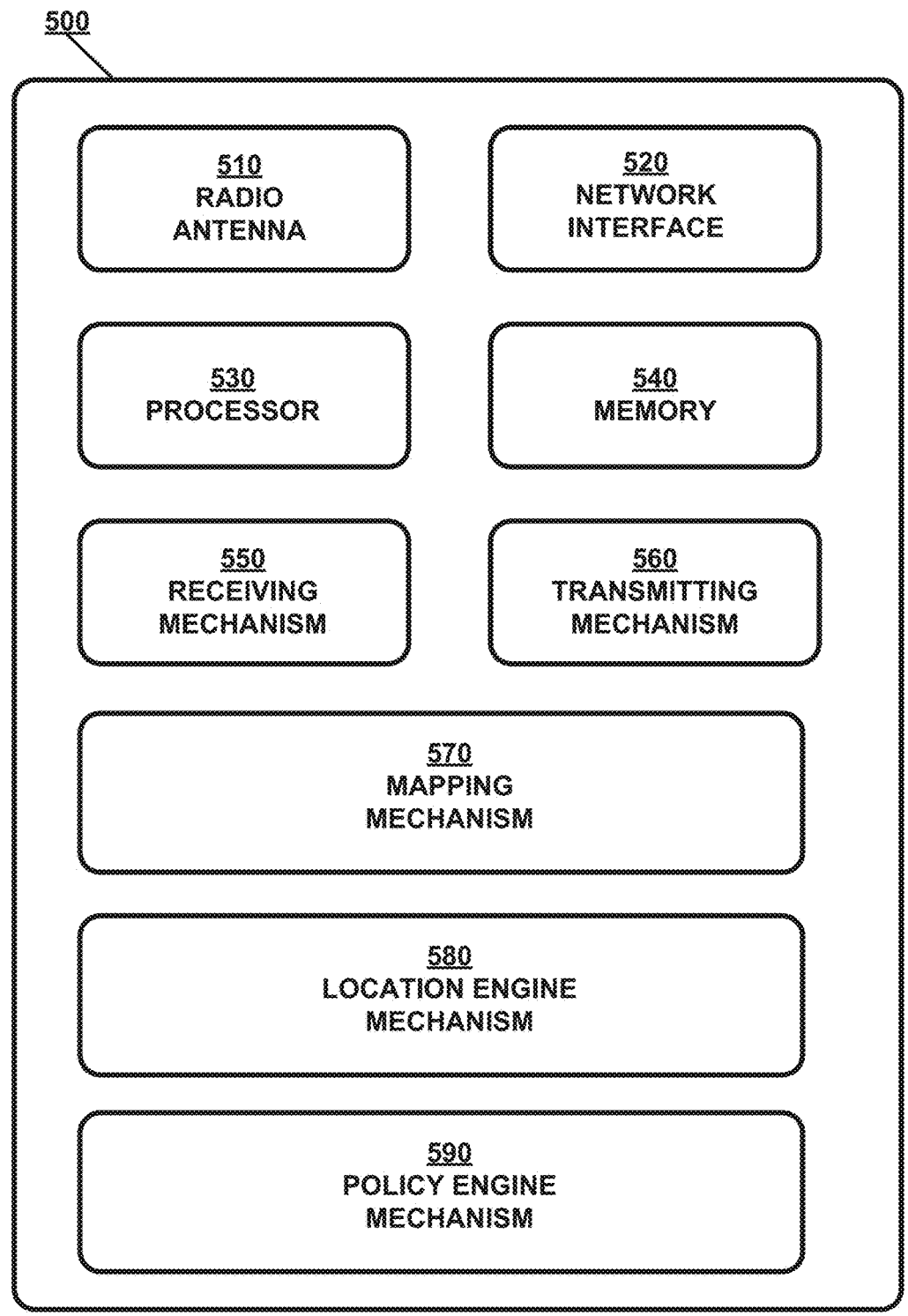
FIG. 5 is a block diagram illustrating an exemplary system for precise and custom location-based service discovery application for wired and wireless devices according to embodiments of the present disclosure.

FIG. 5 is a block diagram illustrating a system for precise and custom location-based service discovery application for wired and wireless devices according to embodiments of the present disclosure.

Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes an receiving mechanism 550, a transmitting mechanism 560, and a mapping mechanism 570, a location engine mechanism 580, and a policy engine mechanism 590, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as, Dynamic Random Access Memory (DRAM), Static Random Access Memory (SRAM), etc.

Receiving mechanism 550 generally receives one or more network messages via network interface 520 or radio antenna 510 from a wireless client. The received network messages may include, but are not limited to, requests and/or responses, beacon frames, management frames, control path frames, and so on.

Transmitting mechanism 560 generally transmits messages, which include, but are not limited to, requests and/or responses, beacon frames, management frames, control path frames, and so on.

Mapping mechanism 570 generally facilitates definition of a precise and custom region by a system administrator. Here, the region can be defined as a physical region in a physical environment. The region also can be defined as a particular room in a plurality of rooms. Mapping mechanism 570 can also allow the system administrator to import a location map of existing wired devices in the WLAN.

Location engine mechanism 580 generally determines a location of a client device. Specifically, location engine mechanism 580 can identify a first region comprising the location of the client device, and also identify at least one network device associated with the first region. Further, the at least one network device includes at least two network devices.

In some embodiments, location engine mechanism 580 can identify that the at least one network device is associated with a second region that includes the first region. Moreover, location engine mechanism 580 can identify a second region including the location of the device, whereas the first region and the second region have an overlapping region that comprises the location. In some embodiments, prior to identifying the at least one network device associated with the first region, location engine mechanism 580 can detect that the at least one network device is located in the first region. In some embodiments, prior to identifying the at least one network device associated with the first region, location engine mechanism 580 further (a) determines that the at least one network device is connected to a second network device; and (b) determines that the second network device is located in the first region. In some embodiments, location engine mechanism 580 can determine that the client device has moved outside of the first region.

Also, location engine mechanism 580 can identify a second network device, from the set of network devices, associated with the second region; whereas regions defined for at least two network devices are different.

Policy engine mechanism 590 generally selects a network device based on a set of predefined policies that correspond to one or more regions. Specifically, responsive at least to determining that the at least one network device is associated with the first region that comprises the location of the client device, policy engine mechanism 590 select the at least one network device for presenting as an available resource to the client device. The selection can further be based on characteristics associated with the client device and/or the set of network devices. Policy engine mechanism 590 can also store information indicating an association between the at least one network device and a region.

In some embodiments, responsive to location engine mechanism 580 identifying a second region including the location of the device, policy engine mechanism 590 presents the second network device as an available resource to the client device.

In some embodiments, responsive to location engine mechanism 580 determining that the client device has moved outside of the first region, policy engine mechanism 590 removes the at least one network device from a set of resources accessible to the client device.

In some embodiments, based on (a) and (b) determined by location engine mechanism 580, policy engine mechanism 590 determines that the at least one network device is located in the first region, and stores information indicating an association between the at least one network device and the first region.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
   determining, by a network management device, a location of a client device in a wireless local area network (WLAN);
   identifying, by the network management device, a first region comprising the location of the client device, wherein an irregular boundary of the first region is arbitrarily defined on a floor plan based on a time-defined device sharing policy comprising at least a start time and an expiration time;
   determining, by the network management device, that the time-defined device sharing policy permits the client device to discover a network service provided by at least one network device; and
   selecting, by the network management device, the at least one network device to be presented as providing the network service available to the client device between the start time and the expiration time associated with the time-defined device sharing policy.

2. The method of claim 1, wherein the first region is defined as a physical region in a physical environment.

3. The method of claim 1, wherein the first region is defined as a particular room in a plurality of rooms.

4. The method of claim 1, wherein the at least one network device comprises at least two network devices.

5. The method of claim 1, further comprising:
   identifying a second region comprising the location of the client device, wherein the first region and the second region have an overlapping region that comprises the location;
   identifying a second network device, from a set of network devices comprising the at least one network device, associated with the second region; and
   presenting the second network device as an available resource to the client device.

6. The method of claim 1, further comprising:
   determining that the client device has moved outside of the first region; and
   responsive to determining that the client device has moved outside of the first region, removing the at least one network device from a set of resources accessible to the client device.

7. The method of claim 1, further comprising:
   prior to identifying the at least one network device associated with the first region:
   detecting that the at least one network device is located in the first region;
   storing information indicating the association between the at least one network device and the first region.

8. The method of claim 1, further comprising:
   prior to identifying the at least one network device associated with the first region:
   (a) determining that the at least one network device is connected to a second network device;
   (b) determining that the second network device is located in the first region;
   (c) based on (a) and (b) determining that the at least one network device is located in the first region; and
   (d) storing information indicating the association between the at least one network device and the first region.

9. The method of claim 1, wherein the selecting operation is further based on characteristics associated with the client device.

10. The method of claim 1, wherein identifying that the at least one network device is associated with the first region comprises:
    identifying that the at least one network device is associated with a second region that comprises the first region.

11. The method of claim 1, wherein regions defined for at least two network devices are different.

12. A network management device comprising:
    a memory;
    a hardware processor executing instructions from the memory to:
    determine a location of a client device in a wireless local area network (WLAN);
    identify a first region comprising the location of the client device, wherein an irregular boundary of the first region is arbitrarily defined on a floor plan based on a time-defined device sharing policy comprising at least a start time and an expiration time;
    determine that the device sharing policy permits the time-defined client device to discover a network service provided by at least one network device; and
    select the at least one network device to be presented as providing the network service available to the client device between the start time and the expiration time associated with the time-defined device sharing policy.

13. The network management device of claim 12, wherein the first region is defined as a physical region in a physical environment or a particular room in a plurality of rooms.

14. The network management device of claim 12, wherein the hardware processor further executes the instructions from the memory to:
   identify a second region comprising the location of the client device, wherein the first region and the second region have an overlapping region that comprises the location;
   identify a second network device, from a set of network devices comprising the at least one network device, associated with the second region;
   present the second network device as an available resource to the client device.

15. The network management device of claim 12, wherein the hardware processor further executes the instructions from the memory to:
   determine that the client device has moved outside of the first region;
   responsive to determining that the client device has moved outside of the first region, remove the at least one network device from a set of resources accessible to the client device.

16. The network management device of claim 12, wherein prior to the hardware processor executing the instructions to identify the at least one network device associated with the first region, the hardware processor further executes the instructions from the memory to:
   detect that the at least one network device is located in the first region;
   store information indicating the association between the at least one network device and the first region.

17. The network management device of claim 12, wherein prior to the hardware processor executing the instructions to identify the at least one network device associated with the first region, the hardware processor further executes the instructions from the memory to:
   (a) determine that the at least one network device is connected to a second network device;
   (b) determine that the second network device is located in the first region;
   (c) based on (a) and (b), determine that the at least one network device is located in the first region;
   (d) store information indicating the association between the at least one network device and the first region.

18. The network management device of claim 12, wherein the hardware processor further executes the instructions from the memory to select the at least one network device to be presented as providing the network service available to the client device based on characteristics associated with the client device.

19. The network management device of claim 12, wherein the hardware processor further executes the instructions from the memory to identify that the at least one network device is associated with a second region that comprises the first region.

20. The network management device of claim 12, wherein regions defined for at least two network devices, of a set of network devices, are different.

* * * * *